United States Patent [19]

Ichimura et al.

[11] Patent Number: 5,567,882

[45] Date of Patent: Oct. 22, 1996

[54] PRESSURE SENSOR USING A FIELD EMISSION COLD CATHODE

[75] Inventors: Kouichi Ichimura, Yokohama; Masayuki Nakamoto, Chigasaki; Masao Obama, Yokosuka; Hiroshi Masumoto, Yokohama, all of Japan

[73] Assignee: Kabushiki Kaisha Toshiba, Kawasaki, Japan

[21] Appl. No.: 526,699

[22] Filed: Sep. 11, 1995

[30] Foreign Application Priority Data

Sep. 16, 1994 [JP] Japan .................................. 6-222158

[51] Int. Cl.$^6$ .................................................. G01L 9/00
[52] U.S. Cl. ........................... 73/717; 73/723; 73/753
[58] Field of Search ............................. 73/717, 723, 753, 73/754

[56] References Cited

U.S. PATENT DOCUMENTS

| | | | |
|---|---|---|---|
| 5,163,328 | 11/1992 | Holland et al. | 73/717 |
| 5,277,067 | 1/1994 | Holland et al. | 73/723 |
| 5,301,554 | 4/1994 | Kane et al. | 73/717 |

FOREIGN PATENT DOCUMENTS 3-9232  1/1991  Japan .

OTHER PUBLICATIONS

Strain Gauges, Kinds and Uses; Sec. 5.2.3; "Diaphragm Types"; Hermann K. P. Neubert; 1967, pp. 140–143.

Sensors and Actuators A, 34; "A Study on Field–Emission Array Pressure Sensors"; pp. 137–154; H.–C. Lee, et al.; 1992.

*Primary Examiner*—Richard Chilcot
*Assistant Examiner*—Paul D. Amrozowicz
*Attorney, Agent, or Firm*—Oblon, Spivak, McClelland, Maier & Neustadt, P.C.

[57] ABSTRACT

The pressure sensor comprises an air-tight vacuum chamber consisting of a hollow cylinder and a pressure-reception diaphragm. The pressure-reception diaphragm is provided to face a space communicating with a space of an object to be measured. A field emission cold cathode device is provided on the inner surface of the pressure-reception diaphragm. The cold cathode device comprises a lot of emitter electrodes arranged in a matrix manner for emitting electrons, and gate electrodes for drawing out electrons. Two anode electrodes facing the cold cathode device are provided on the inner end surface of the cylinder. The anode electrodes are connected to a differential amplifier for amplifying a variation in output distribution between them.

11 Claims, 3 Drawing Sheets

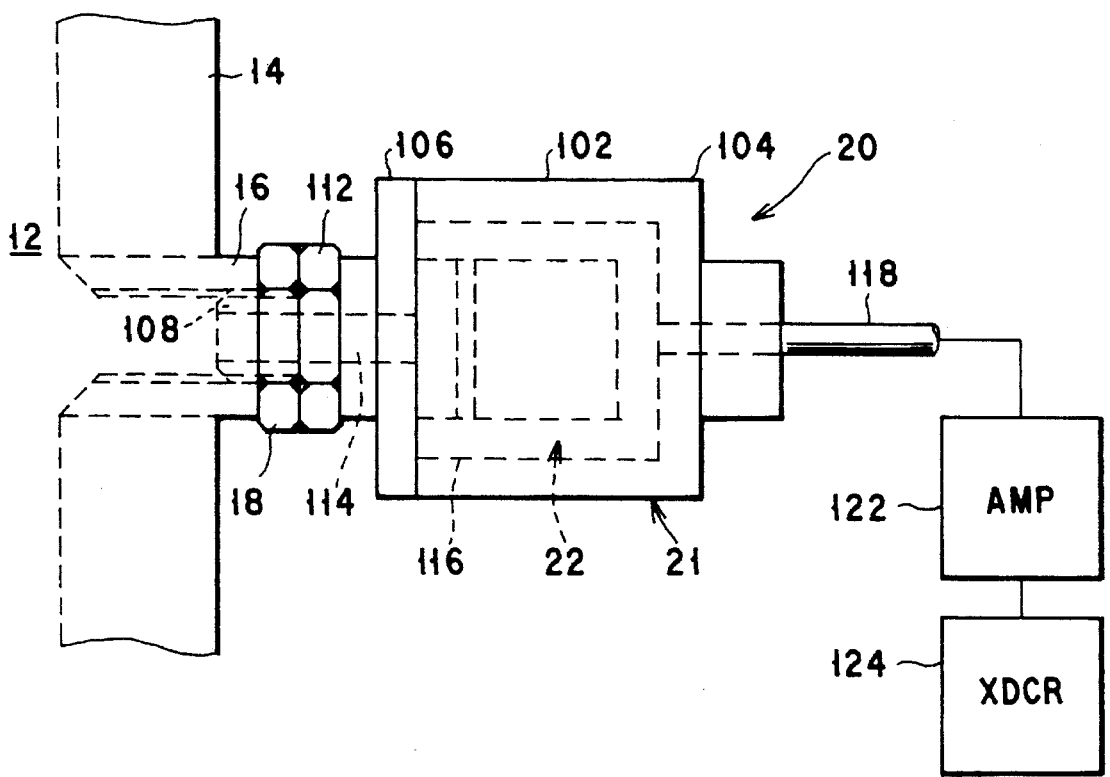
F I G. 2

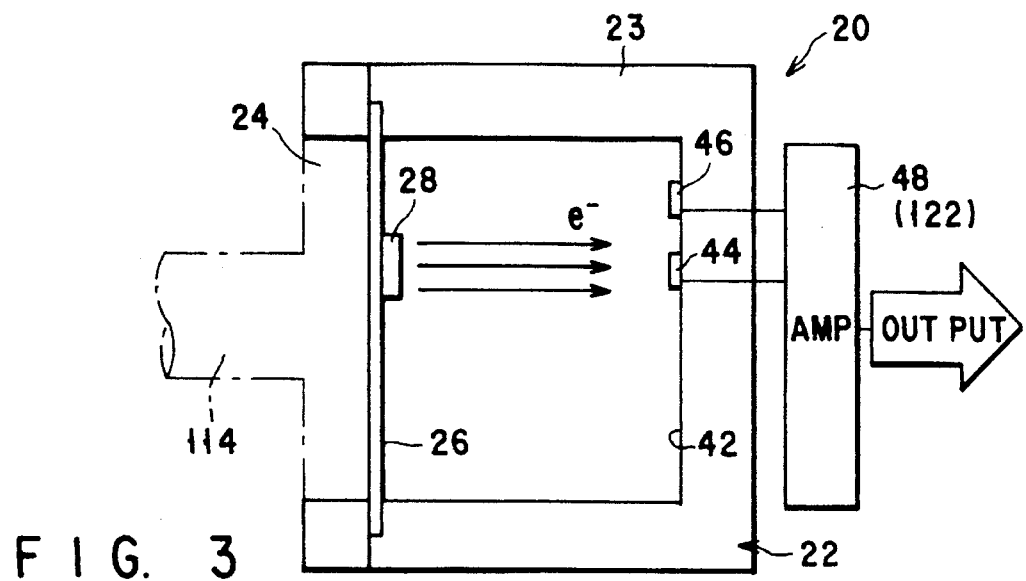
F I G. 3
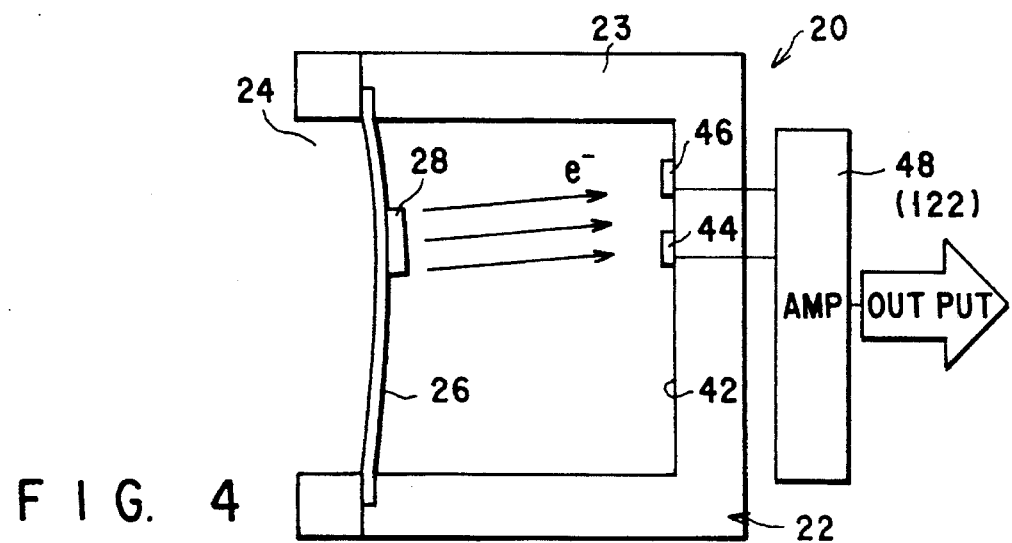
F I G. 4

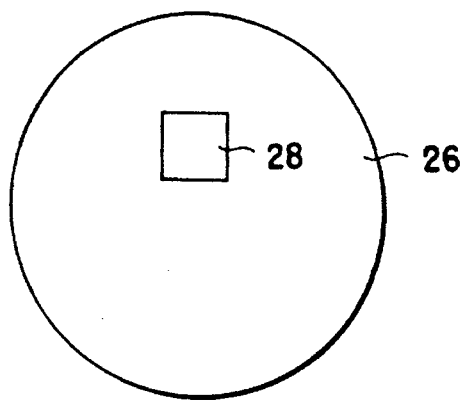
F I G. 6
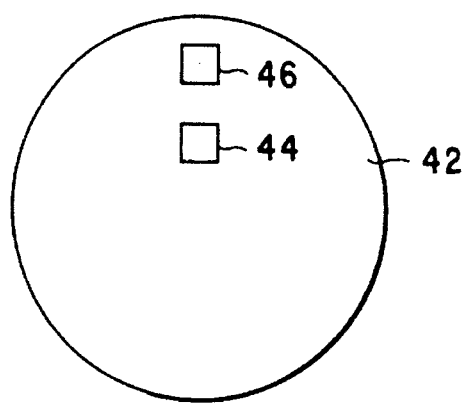
F I G. 7
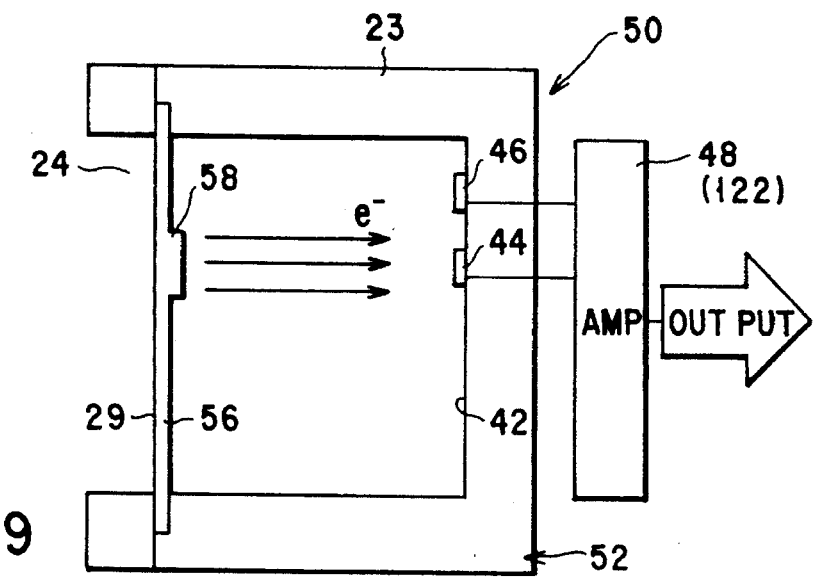
F I G. 9
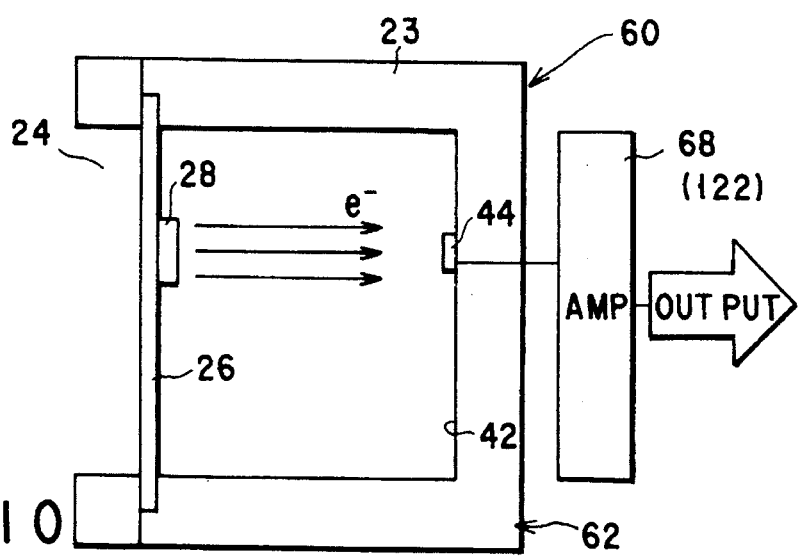
F I G. 10

PRESSURE SENSOR USING A FIELD EMISSION COLD CATHODE

BACKGROUND OF THE INVENTION

1. Field of the Invention

The present invention relates to a pressure sensor and, in particular, to a pressure sensor employing a field emission cold cathode device that is usable in a radioactive irradiation environment or a high temperature environment.

2. Description of the Related Art

As a conventional small, high-sensitive pressure sensor, a diffusion-type semiconductor pressure sensor is known. Its construction is exemplified in, for example, *Sensor Cyclopedia*, chief ed. Kiyoshi TAKAHASHI (Asakura Shoten Co., 1991). An example of the diffusion-type semiconductor pressure sensor will now be described with reference to FIG. 1.

FIG. 1 illustrates a pressure-reception diaphragm 1 consisting of processed silicon monocrystal. If the pressure-reception diaphragm 1 is made of, for example, n-type silicon, boron is diffused on a portion of the pressure-reception diaphragm 1 where distortion is detected and a p-type gauge resistance 2 is thereby formed. The pressure-reception diaphragm 1 is provided, through a connecting portion 4, on base 5, to which a pressure introduction pipe 6 is connected.

If pressure is introduced into the pressure-reception diaphragm 1 through the pressure introduction pipe 6, the pressure-reception diaphragm 1 is deformed according to the pressure introduced. The resistance value of the p-type gauge resistance formed on the portion of the pressure-reception diaphragm 1, where distortion is detected, varies with the deformation. Pressure can be thus detected by measuring a variation in resistance.

However, the pressure sensor employing semiconductor elements of this kind has such a problem as to be unable to operate in a high-temperature environment or a radioactive irradiation environment due to its vulnerability to high temperature and radiation. For the diffusion-type semiconductor pressure sensor, for instance, temperatures at which there is no change in its operation characteristics usually range around 0° C. to 50° C. and temperatures at which the sensor is operable range around −20° C. to 100° C. In respect of radiation, it does not operate properly if the accumulated dose of gamma radiation reaches around $10^5$ Roentgen. In the containment vessel of an atomic reactor, the accumulated dose of gamma radiation is $10^4$ Roentgen per hour. Considering this, it is inappropriate to measure pressure, using a conventional pressure sensor employing semiconductor elements in this environment.

It is of quite importance to grasp pressure variations in the containment vessel when an accident happens, in view of preventing the accident from spreading or of investigating its cause later. At this time, an accumulated dose might be well above normal operation level. It is, in particular, inappropriate to use the conventional semiconductor elements for measuring pressure at the time of the accident even for a short period of time.

As mentioned above, problems arise in the conventional diffusion-type semiconductor sensor. Namely, charging carriers within the semiconductor elements are sensitive to temperature and radioactive irradiation, and radioactive irradiation causes defects relatively easily. Therefore, the sensor, which is vulnerable to high-temperature or radiation, does not operate properly in the environment.

SUMMARY OF THE INVENTION

The present invention has been made in consideration of the circumstances and its object is to provide a small and high sensitive pressure sensor that is usable in such environments as the containment vessel of an atomic reactor, which has environment resistance characteristics such as radiation resistance and high-temperature resistance.

According to a first aspect of the present invention, there is provided a pressure sensor comprising:

an air-tight vacuum chamber including a pressure-reception diaphragm which is deformable by pressure and to which pressure of an object to be measured is applied;

a field emission cold cathode device provided on the pressure-reception diaphragm within the air-tight vacuum chamber and having emitter electrodes for emitting electrons and gate electrodes for drawing out electrons from the emitter electrodes;

an anode electrode arranged to face the field emission cold cathode device within the air-tight vacuum chamber;

an amplifier connected to the anode electrode and amplifying a variation in an electron amount flowing through the anode electrode from the emitter electrodes; and a transducer for converting an output from the amplifier into a signal representing pressure.

According to a second aspect of the present invention, there is provided a pressure sensor comprising:

an air-tight vacuum chamber having a pressure-reception diaphragm which is deformable by pressure and to which pressure of an object to be measured is applied;

a field emission cold cathode device provided on the pressure-reception diaphragm within the air-tight vacuum chamber and having emitter electrodes for emitting electrons and gate electrodes for drawing out electrons from the emitter electrodes;

first and second anode electrodes arranged to face the field emission cold cathode device within the air-tight vacuum chamber;

an amplifier connected to the first and second anode electrodes and amplifying a variation in difference between electron amounts respectively flowing through the first and second anode electrodes from the emitter electrodes; and a transducer for converting an output from the amplifier into a signal representing pressure.

In the pressure sensor according to the first aspect of the present invention, if pressure is applied to the pressure-reception diaphragm, the diaphragm is deformed and the direction in which electron beam is discharged from emitter electrodes varies. As a result, electron inflow to an anode electrode; i.e. current flowing therethrough varies. The variation is detected by an amplifier and outputted according to the pressure applied.

In the pressure sensor according to the second aspect of the present invention, if pressure is applied to the pressure-reception diaphragm, the diaphragm is deformed and the direction in which electron beam is discharged from emitter electrodes varies. As a result, electron inflow to the both anode electrodes; i.e. the difference in current flowing therethrough varies. The variation is detected by an amplifier and outputted according to the pressure applied.

As can be seen from the above, semiconductor elements are not employed in the process of converting the deformation of the pressure-reception diaphragm by pressure into a variation in the current value of the anode electrode. This allows the sensor to be highly resistant to a high-pressure or radiation environment. Besides, the pressure sensor includes the air-tight vacuum chamber as the main part, containing the cold cathode device and anode electrodes therein, and having the pressure-reception diaphragm as its part, so that it has a small size and a simple construction.

Additional objects and advantages of the invention will be set forth in the description which follows, and in part will be obvious from the description, or may be learned by practice of the invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and together with the general description given above and the detailed description of the preferred embodiments given below serve to explain the principles of the invention.

FIG. 2 is a side view showing a state in which the sensor head of a pressure sensor according to the first embodiment of the present invention is connected to an object to be measured.

FIG. 3 is an explanatory sectional view showing a pressure detection unit in the sensor head shown in FIG. 2.

FIG. 4 is an explanatory sectional view showing a state in which the pressure detection unit shown in FIG. 3 is pressurized.

FIG. 6 is a plan view showing the pressure-reception diaphragm of the pressure detection unit of FIG. 3.

FIG. 7 is a plan view showing an inner end surface of a cylinder of the pressure detection unit of FIG. 3.

FIG. 9 is an explanatory sectional view showing a pressure detection unit within a sensor head of a pressure sensor according to another embodiment of the present invention.

FIG. 10 is an explanatory sectional view showing a pressure detection unit within a sensor head of a pressure sensor according to yet another embodiment of the present invention.

DETAILED DESCRIPTION OF THE PREFERRED EMBODIMENTS

Figure 1:
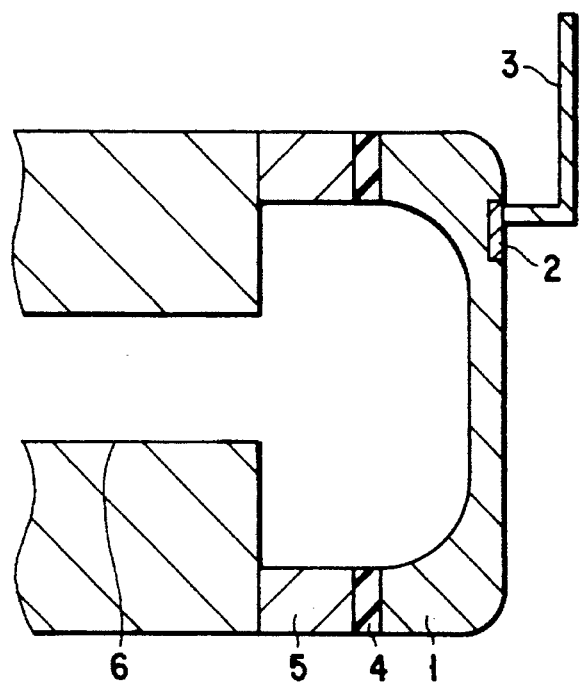
FIG. 1 is an explanatory sectional view showing a conventional diffusion-type semiconductor pressure sensor.

FIG. 2 shows that a pressure sensor 20 according to an embodiment of the present invention comprises a sensor head 21 which is fitted to a wall 14 defining an object to be measured; i.e. space 12. For instance, a pressure introduction nozzle 16 which has a nut flange 18 provided on its end is fitted to the wall 14. The measuring space 12 means, for example, an inner space such as a containment or a pipe influenced by radiation in a reactor plant.

The sensor head 21 comprises a pressure tight cylinder housing 102 made of stainless steel which defines an air-tight internal space 116. The housing 102 includes a housing main body 104 and a cap 106 which is detachably equipped with the main body 104. A connector nozzle 108 having the nut flange 112 on its bottom is fitted to the cap 106.

A male screw is provided on the outer surface of the connector nozzle 108 and a female screw for engaging with the male screw is formed on the inner surface of the pressure introduction nozzle 16. Therefore, the sensor head 21 is detachably fitted to the pressure introduction nozzle 16 by means of the screw mechanism. An axial bore 114 is formed in the connector nozzle 108 and the measuring space 12 communicates with the space 116 in the housing 102 through the bore 114.

A pressure detection unit 22 for detecting pressure of the measuring space 12, is provided in the housing 102, or in the space 116. An electric signal from the pressure detection unit 22 is transmitted through a code 118 to an amplifier 122 provided outside the sensor head 21 and is subjected to processing described below. The signal outputted from the amplifier is transmitted to a transducer 124 such as an indicator or a computer for converting the output signal into a signal indicating pressure, e.g. an electric signal.

FIG. 3 illustrates the pressure detection unit 22 in the sensor head 21 in detail.

The pressure detection unit 22 consists of a main housing, i.e. hollow cylinder 23 made of insulating material, e.g. glass, which has an opening 24 on one end, and a pressure-reception diaphragm 26 which is made of insulating material, e.g. glass, and is fixed to the cylinder 23 in such a manner as to cover the opening air-tightly. The cylinder 23 and the pressure-reception diaphragm 26 form an air-tight vacuum chamber. The opening communicates with the axial bore 114 of the connector nozzle 108.

According to this embodiment, the cylinder has an inside diameter of 8 mm, a height of 5 mm and a wall thickness of 2 mm. The pressure-reception diaphragm 26 has a radius of 5 mm and a thickness of 0.2 mm. The pressure-reception diaphragm 26 is connected to the cylinder in the vacuum chamber which is kept to, for example, $5 \times 10^{-7}$ Pa.

Figures 5, 8A, 8B:
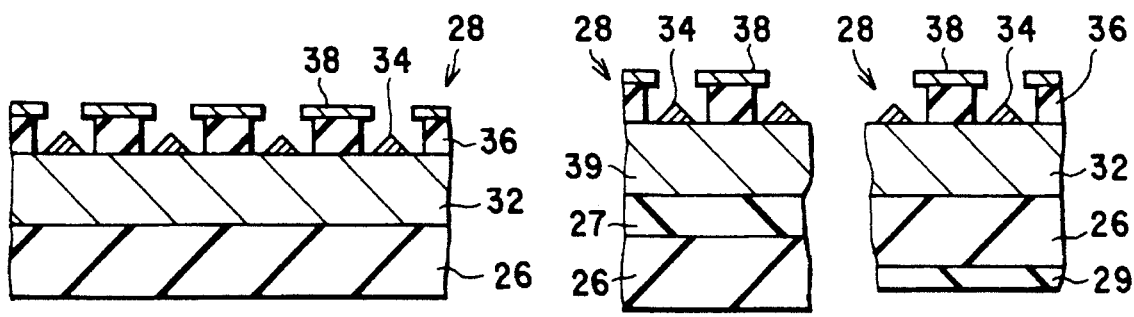
FIG. 5 is a sectional view showing an enlarged pressure-reception diaphragm and an enlarged cold cathode device of the pressure detection unit of FIG. 3.
FIGS. 8A and 8B are sectional views showing modified embodiments of the construction of FIG. 5, respectively.

As shown in FIGS. 3 and 6, a field emission cold cathode device 28 is fixed to a position deviated from the center of the pressure-reception diaphragm 26. The cold cathode device 28 has, as shown in FIG. 5, a number of minute cold cathodes, i.e. emitter electrodes 34 provided on a conductive substrate 32. Gate electrodes 38 are provided on the substrate 32 through an insulating layer 36 to surround the emitter electrodes 34. The gate electrodes 38 function as drawing out electrons from the emitter 34.

Each of the minute cold cathodes or emitter electrode 34 is made of tungsten and has a pyramid shape of 1 µm in base and 0.7 µm in height. The emitter electrodes 34 are arranged in a matrix manner of 100 by 100, and maintain a distance of 2 µm to adjacent electrodes. Before equipping the pressure-reception diaphragm 26 with the cylinder 23, the cold cathode device 28 is bonded to the pressure-reception diaphragm 26 by the electrostatic bonding method.

As shown in FIGS. 3 and 7, a pair of anode electrodes 44 and 46 are fixedly provided on the inner end surface 42 of the cylinder facing the pressure-reception diaphragm 26. The anode electrode 44 is arranged to align its center with the center of the cold cathode device 28. The anode electrode 46 is arranged to depart upward from the profile of the cold cathode device 28. The anode electrodes 44 and 46 are connected to differential amplifier 48 (corresponding to the amplifier 122 of FIG. 2) provided outside the cylinder.

Each of the anode electrodes 44 and 46 has a size of 0.5 mm by 0.5 mm by 10 nm in the embodiment. They are formed by vapor-depositing aluminum on the pressure-reception diaphragm 26.

The operation of the pressure sensor shown in FIG. 3 will be now described while comparing FIG. 3 with FIG. 4.

FIG. 3 illustrates a non-pressurized state in which pressure is not applied to the pressure-reception diaphragm 26. In the embodiment, a drive voltage for drawing out electrons in a non-pressurized state was 30 V and the entire current flowing through the anode electrodes was 10 mA.

FIG. 4 illustrates a pressurized state in which pressure is applied to the pressure-reception diaphragm 26. As can be seen from FIG. 4, the pressure-reception diaphragm 26 is deformed if the pressure of the object to be measured, i.e. space 12 varies from an initial state and pressure is applied to the pressure-reception diaphragm 26. The direction of electron beam discharged from a group of the emitter electrodes 34 of the cold cathode device 28 provided on the pressure-reception diaphragm 26 varies, accordingly.

For example, if the pressure-reception diaphragm 26 is deformed and the direction of electron beam varies as shown in FIG. 4, current flowing through the first anode electrode 44 decreases and current flowing through the second anode electrode 46 increases. That is, the current distribution, i.e. difference between the anode electrodes 44 and 46 varies. The variation in the current difference is amplified by and outputted from the differential amplifier 48. The pressure applied to the pressure-reception diaphragm 26 is measured using the output value.

According to the embodiment, the output from the differential amplifier 48 was about 100 μV per Pa pressure of the object to be measured, i.e. space 12. The sensitivity was equal to or more than that of the conventional diffusion-type semiconductor pressure sensor. The sensor operated even at a high temperature of 200° C. Or under conditions of radioactive irradiation, it operated normally even after the accumulated dose of gamma rays reached 107 Roentgen.

In the pressure sensor 20 illustrated by FIGS. 3 to 7, if pressure is applied to the pressure-reception diaphragm 26, it is deformed and the direction of electron beam discharged from a group of the minute cold cathode devices 34 varies. As a result, the current distribution between the anode electrodes 44 and 46 varies. The variation is detected by the differential amplifier 48 high-sensitively and an output according to the pressure applied is obtained.

As described above, the sensor does not employ a semiconductor device in the process of converting the deformation of pressure-reception diaphragm 26 by pressure into a variation in the current distribution between the anode electrodes 44 and 46. Therefore, it is possible to obtain environment resistance characteristics such as radiation resistance and high-temperature resistance. Also, since the output difference between the two anode electrodes 44 and 46 is detected by the differential amplifier 48, the so-called background-free detection is made possible, thereby enabling dynamic-range as well as high-sensitive detection. A pressure variation is converted into a current distribution variation, using the air-tight vacuum chamber which contains the field emission cold cathode device 28 and the anode electrodes 44, 46 therein, and having the pressure-reception diaphragm 28 as its part. Therefore, the sensor consists of small and simple members and can be miniaturized.

Particularly, from the viewpoint of preventing the influence of radiation, the present invention regards a pressure variation as a variation in field emission current which is not virtually affected by radiation. According to the embodiment, the emitter electrodes 34 are made of material which is not easily affected by radiation and is heat-proof, such as metallic material, in particular, W, Ti, Mo, Nb, Ta and the like, and alloy based on at least any one of them. With such emitter electrodes 34, the pressure sensor has excellent resistance to radiation and high-temperature.

Also, in case the emitter electrodes 34 are made of semiconductor such as Si, the work function of the surface adjacent to the tip ends of the emitter electrodes 34 may be changed by radiation, thereby effecting on field emission current. However, defects hardly concentrate on a narrow region adjacent to tip ends of the emitter electrodes 34. Nor do a few defects, if any, considerably affect emission current.

Moreover, in order to improve resistance of the pressure sensor to radiation, it is possible to make the pressure-diaphragm 26 itself out of radiation shielding material, e.g. AlN doped with Pb. FIG. 8A exemplifies a modification, where a layer 27 made of radiation shielding material, e.g. AlN doped with Pb is formed between the pressure-reception diaphragm 26 and the conductive substrate 32 of the cold cathode device 28. FIG. 8B exemplifies another modification, where the pressure receiving surface of the pressure-reception diaphragm 26 is covered with radiation shielding material, e.g. coating 29 made of Pb containing rubber.

FIG. 9 is an explanatory sectional view showing a pressure-detection unit 52 in the sensor head of a pressure sensor 50 according to another embodiment of the present invention. In FIG. 9, same reference numerals as those in FIGS. 2–7 denote the same members as those in the pressure sensor 20.

The pressure sensor 50 differs from the pressure sensor 20 in that a field emission cold cathode device 58 is formed in such a manner that the cathode device 58 includes a pressure-reception diaphragm 56 itself as a substrate. The pressure-reception diaphragm 56 made of a silicon monocrystal substrate having the (100) crystal plane, is n-type conductive and 200 μm thick. The cold cathode device 58 is formed on a region of 200 μm by 200 μm deviated from the center of the pressure-reception diaphragm, i.e. substrate 56. The pressure receiving surface of the pressure-reception diaphragm 56 is covered with a coating 29 made of radiation shielding material. The pressure-reception diaphragm 56 and the cold cathode device 58 essentially have the same sectional shapes as those shown in FIG. 8B. In the pressure sensor 50, members 26 and 32 of FIG. 8B are replaced with the pressure-reception diaphragm or substrate 56.

Unlike the pressure sensor 20, minute cold cathodes, i.e. emitter electrodes of the pressure sensor 50 are formed by patterning the silicon substrate 56 by means of anistropic etching. Each of the emitter electrodes is a pyramid in shape with a base of 1 μm and a height of 0.7 μm. They are arranged in a matrix manner of 100×100 and maintain a distance of 2 μm between the adjacent ones.

Like the pressure sensor 20, gate electrodes for drawing out electrons are provided through an insulating layer to surround the emitter electrodes of the pressure sensor 50. The insulating layer and gate electrodes are formed by sputtering using a mask.

The pressure sensor 50 according to the embodiment shown in FIG. 9 is easy to produce and is the same as the pressure sensor according to the preceding embodiment in performance relating to sensitivity and resistance to environment.

FIG. 10 is an explanatory sectional view showing a pressure-detection unit 62 in the sensor head of a pressure sensor 60 according to yet another embodiment of the present invention. In FIG. 10, the same reference numerals as those shown in FIGS. 2–7 denote the same members as those of the pressure sensor shown therein.

The pressure sensor 60 differs from the pressure sensor 20 in that only one anode electrode 44 is provided on the pressure-reception diaphragm 26. The anode electrode 44 is arranged to align its center with that of the cold cathode device 28. The anode electrode 44 is connected to an amplifier 68 (corresponding to the amplifier 122 of FIG. 2) provided outside the cylinder 23.

In the pressure sensor 60, if the pressure-reception diaphragm 26 is deformed and the direction of electron beam varies, current flowing through the anode electrode 44 varies. A variation in current is amplified by and outputted from the amplifier 68, and pressure applied to the pressure-reception diaphragm 26 is measured using the output value.

The pressure sensor 60 according to the embodiment of FIG. 10 is of benefit, in particular, if no high sensitivity is required.

As mentioned so far, the present invention can provide a small and high sensitive pressure sensor which is usable even in environments such as the containment vessel of an atomic reactor and which has excellent resistance to environment like resistance to radiation and resistance to high temperature.

Additional advantages and modifications will be readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A pressure sensor comprising:

an air-tight vacuum chamber having a pressure-reception diaphragm which is deformable by pressure and to which pressure of an object to be measured is applied;

a field emission cold cathode device provided on said pressure-reception diaphragm within said air-tight vacuum chamber and having emitter electrodes for emitting electrons in a beam direction and gate electrodes for drawing out electrons from said emitter electrodes;

first and second anode electrodes arranged to face said field emission cold cathode device within said air-tight vacuum chamber;

an amplifier connected to said first and second anode electrodes and amplifying a variation in difference between electron amounts respectively flowing through said first and second anode electrodes from said emitter electrodes; and a transducer for converting an output from said amplifier into a signal representing pressure, wherein said emitter electrodes and said first and second anode electrodes are arranged such that when the pressure of the object is applied to said pressure-reception diaphragm the beam direction is changed by a deformation of said pressure-reception diaphragm, and causes the variation in difference between electron amounts respectively flowing through said first and second anode electrodes from said emitter electrodes.

2. The pressure sensor according to claim 1, wherein said emitter electrodes are made of metallic material.

3. The pressure sensor according to claim 2, wherein said emitter electrodes are made of said metallic material selected from a group consisting of W, Ti, Mo, Nb, Ta and an alloy based on at least one of them.

4. The pressure sensor according to claim 1, wherein said air-tight vacuum chamber comprises a main housing having an opening and said pressure-reception diaphragm to cover said opening, said main housing being made of insulating material.

5. The pressure sensor according to claim 1, wherein said pressure-reception diaphragm is made of insulating material and said cold cathode device is formed on a conductive substrate provided on said pressure-reception diaphragm.

6. The pressure sensor according to claim 5, wherein said pressure-reception diaphragm is made of insulating and radiation shielding material.

7. The pressure sensor according to claim 5, wherein a radiation shielding material layer is provided between said pressure-reception diaphragm and said conductive substrate.

8. The pressure sensor according to claim 5, wherein a surface receiving pressure of the object to be measured is covered with a radiation shielding material layer.

9. The pressure sensor according to claim 1, wherein said pressure-reception diaphragm is made of conductive material and said cold cathode device is formed on said pressure-reception diaphragm which serves as a substrate of said cold cathode device.

10. The pressure sensor according to claim 9, a surface receiving pressure of the object to be measured is covered with a radiation shielding material layer.

11. The pressure sensor according to claim 1, wherein said field emission cold cathode device is provided on said pressure-reception diaphragm at a position deviated from a center of said pressure-reception diaphragm.

\* \* \* \* \*